Aug. 6, 1968 K. K. NONOMURA 3,396,401

APPARATUS AND METHOD FOR THE MARKING OF INTELLIGENCE ON A RECORD MEDIUM

Filed Oct. 20, 1966

3,396,401
Patented Aug. 6, 1968

1

3,396,401

APPARATUS AND METHOD FOR THE MARKING OF INTELLIGENCE ON A RECORD MEDIUM

Kenneth K. Nonomura, Honolulu, Hawaii
(2739 Culver Road, Apt. B–34, Rochester, N.Y. 14622)

Filed Oct. 20, 1966, Ser. No. 588,146
11 Claims. (Cl. 346—1)

ABSTRACT OF THE DISCLOSURE

Apparatus and method wherein laser beam is used for thermally fixing pigment or the like to paper or other such record medium.

This invention relates to methods and apparatus for the writing or marking of information, data and other forms of intelligence on a record medium such as paper, and more particularly to methods and apparatus for the high-speed copying, printing and duplication or the like of intelligence on copy paper or a similar record medium.

In accordance with a preferred embodiment of the invention, it is proposed that an original document or image be scanned by a suitable scanning means and translated into electrical signals which are then used to control a highly intensified beam of light such as a laser beam which is employed to produce copies by means of thermally activating fixing means to affix pigments or the like to a paper or some other such record medium.

In accordance with a feature of the invention, it is possible to use the aforesaid electrical signals directly to control the laser beam. Alternatively, such electrical beams may be stored, for example, on a magnetic tape or the like and subsequently employed to control the laser beam either for the purpose of producing a single copy of the intelligence or to produce a number of such copies as required.

The laser beam which is preferably employed in accordance with the invention may be deflected transversely across the copy paper, while the control signal activates or inactivates the beam according to where printing is desired the laser beam being employed to melt and fuse a suitable medium such as a specially prepared powdered ink onto the paper or otherwise produce a latent image on the paper to be developed subsequently by ink powder or other means at a later stage in the process.

As a feature of the invention, it is possible to employ the laser beam itself to cut sections from the paper being processed or such other record medium as may be subjected to the beam, in order to provide for plural copies.

Since the process of the invention is less mechanical than previously known printing systems, there are a number of advantages which are obtained. Firstly, the amount of reduction or enlargement can be precisely set by proper control of the speed of the record medium relative to the beam processing the same. As an alternative or in combination therewith, the beam deflection may be precisely adjusted in highly advantageous manner. Secondly, the speed of printing is many times faster than most methods currently known. Still further it is possible in accordance with the invention to store successive pages on a magnetic tape or in a like storage device, which makes it possible to eliminate manual or mechanical collating.

The above and other objects and features of the invention will become apparent from the following detailed description of a preferred embodiment as illustrated in the accompanying drawing, in which:

FIGURE 1 is a diagrammatic view illustrating a copying device provided in accordance with one embodiment of the invention;

2

Figures 1, 2, 3, 4:
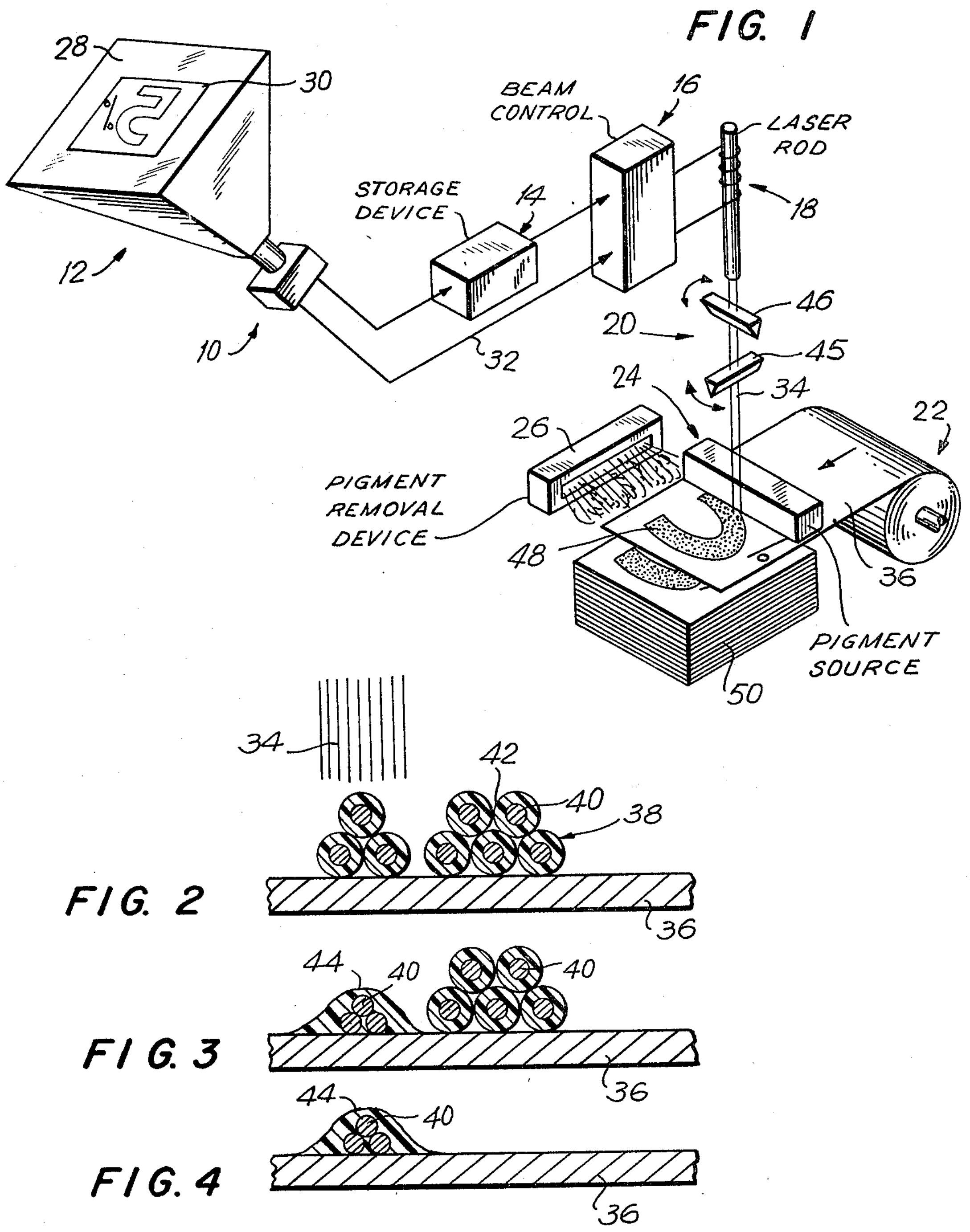
FIGURE 2 illustrates a record medium having thereon coated pigments to be bound thereto in accordance with the invention.
FIGURE 3 illustrates the record medium of FIG. 2, with part of the pigment material bound thereto.
FIGURE 4 shows the record medium with the bound pigments alone remaining thereupon, the loose pigments having been removed.

The apparatus diagrammatically illustrated in FIG. 1 illustrates one embodiment of the invention which comprises generally scanning apparatus 10 cooperating with a viewing apparatus 12, a storage device 14, a control device 16, a laser device 18, a laser beam control 20, a source 22 of a record medium, a source 24 of pigment and a device 26 for removing from the record medium the pigment which is not affixed thereto.

With respect to the viewing device 12, this may be provided with a document-supporting glass 28, upon which will rest the document 30 to be reproduced, said document will be in inverted position to provide for proper scanning by the scanning device 10.

The scanning device 10 may be any one of the various conventional camera tubes employed in commercial television system, including image orthicons, iconoscopes and vidicons, each of which are well known and conventional and require no further desccription in this text.

The storage device 14 may be any conventional video tape storage device, also well known and commercially available. Said storage device 14 may feed its signals directly to the control 16 but alternatively signals may be fed directly from the scanning device 10 to the control 16 via line 32.

The control device 16 may be any ocntrol device employed to control a laser beam, such devices being conventional and not within the scope of the instant invention. The function of the control device 16 is to turn the laser beam on or off and in certain cases to vary the intensity of the beam between determinable limits of maximum or minimum illumination.

The laser device 18 is a source of highly intense light focused in the form of a beam of parallel rays. The term "laser" stands for light amplification by stimulated emission of radiation. It is similar in operating principle to the maser. The laser is, as has been indicated, a device capable of amplifying or generating coherent light. Its principal applications heretofore have been in connection with space communication and high resolution radar. The beam which a laser produces can be focused to a spot of a few ten millionths of an inch in diameter. It thereby produces very localized flux densities.

In practice it has been customary to employ a cylindrical ruby rod with a reflecting coating at each end, which rod is coaxially placed in a helical flash lamp. Green light from the lamp is absorbed by the ruby and red light is generated and coupled out of the system through a hole in one of the aforesaid reflecting coatings at an end of the rod.

The control device 16 controls the supply of energy to the laser and therefore the turning on or off of the beam indicated at 34.

The source 22, as illustrated, is a source of a continuous strip 36 of paper. The source 24 of pigment, as will be described in greater detail hereinafter, deposits uniformly on said strip 36 a coating of special pigment particles. When these particles are impinged upon by the beam 34, they are affixed to the strip 36. Those particles which are not so impinged upon by the laser beam are not affixed to the strip 36 and can be removed by various means. By way of example, device 26 is illustrated which simply blows the unattached pigments from the strip.

The strip 36 is shown in FIGS. 2–4, which portray the sequential steps in the operation. In these figures are shown a plurality of pigment particles 38, each having a pigment core 40 and a coating 42 of a wax or resinous material. An appropriate fixing substance may be constituted as aforesaid by wax, paraffin or other thermally actuatable substance, as indicated, for example, in Patent 2,297,691, which issued October 6, 1942, to Chester F. Carlson. A wide variety of thermally actuatable fixing substances are already known and are not per se within the scope of the instant invention.

Illustrated in FIG. 2 is the beam 34 impinging upon a portion of the pigment particles 38 supported on strip 36. The coating of the pigment particles, impinged upon by said ray, melt and form a continuous coating 44, as appears in FIG. 3. The remainder of the pigment particles remain unattached to the strip 36. Subsequently, by action of the device 26 operating transversely of the strip 36, the unattached particles 38 are removed from strip 36 and only those pigment cores 40 covered by the previously melted coating 44 are permanently attached to said strip.

In accordance with the invention, the beam 34 is controlled not only in respect of being turned on or shut off, but also in respect of reproducing the intelligence scanned on original document 30. This necessitates correlation between the scanning and reproduction as it relates to the position of beam 34. The device 20 provides for the required movement of the beam 34 relative to strip 36 and this is effected under the control of said device 20 by means (not shown) similar to those employed in a television receiver whose operation must be synchronized with that of an associated scanning device.

To this end the beam control device 20 comprises a pair of prisms 45 and 46, arranged on axes which are mutually perpendicular and about which the prisms are respectively rotated. By reason of this arrangement the beam is displaceable along any two-dimensional area so that the intelligence scanned from document 30 can be readily reproduced. The reproduction is indicated at 48 and a stack 50 of reproduced copies is illustrated to show that by use of the storage device 40 a plurality of copies can be readily made. Said copies can be severed from the strip 36 by use of the laser beam itself which can be employed to cut individual sheets from the strip.

Quite generally the technique of the invention involves a method which comprises creating marks of intelligence on a record medium by the use of a laser beam. These marks can be produced, as has been illustrated, by fixing pigment particles to the record medium by melting a thermally actuatable fixing agent. The technique involves moving the beam with respect to the medium to form the marks of intelligence and alternatively or concomitantly the medium can be moved with respect to the beam.

For purposes of reproduction, the method of the invention comprises scanning an original image to generate control signals which are employed to control a laser beam and thereby reproduce the image on a record medium. As has been indicated, the thusly generated control signals may be stored prior to the use of the same in controlling the laser beam.

The marks produced in accordance with the invention may be of solid form and of continuous tone. Alternatively, however, the marks may be formed as a multitude of dots as is known from halftone procedures.

The apparatus of the invention generally involves the use of means for producing a beam of relatively intense light, means for supporting the medium to be treated in a position to intercept the beam whereby the medium is marked in one of the ways as has been indicated above, and further means to control the beam as to the related positions of the beam and medium to cause intelligence to be traced on the medium by the controlled marking of the latter.

"Intelligence" as employed in this text is intended to mean any form of intelligence including numbers, letters, words, hieroglyphics and symbols of any sort, as well as pictures, codes and all sorts of meaningful representations whatsoever.

"Record medium" as used in this text is intended to cover paper, wood, plastics and all sorts of like materials.

There will now be obvious to those skilled in the art many modifications and variations of the method and apparatus set forth above. These modifications and variations will not depart from the scope of the invention if defined by the following claims.

What is claimed is:

1. A method comprising creating marks of intelligence on a record medium by placing on said medium loose particles of visible material having a thermally responsive bonding agent associated therewith and independent of the medium and directing an intense beam of light towards said medium and controlling the relationship between the beam and record medium so that the particles of visible material are affixed by the bonding agent to the record medium in the form of said marks of intelligence.

2. A method as claimed in claim 1 wherein said intense beam of light is a laser beam.

3. A method as claimed in claim 2 wherein said beam is moved with respect to said medium to form said marks.

4. A method as claimed in claim 2 wherein said medium is moved with respect to said beam.

5. A method as claimed in claim 2 comprising scanning an original image to generate control signals which are employed to control said laser beam and thereby reproduce said image on said record medium.

6. A method as claimed in claim 5 comprising storing the control signals prior to using the same to control said laser beam and using the thusly stored control signals to control the laser beam to produce a plurality of reproductions.

7. A method as claimed in claim 2 wherein the record medium is supplied as a continuous strip and the laser beam is used to cut individual sheets from the strip.

8. Apparatus for recording intelligence on a record medium adapted for being marked by intense light, said apparatus comprising first means for producing a beam of relatively intense light, second means for supporting said medium in a position to intercept said beam whereby the medium is marked, and third means to control said beam and the relative positions of the beam and medium to cause said intelligence to be traced on the medium by the controlled marking of the latter, and means to distribute loosely on said medium visible particles and a thermally responsive fixing agent which responds to said beam to fix said particles to said medium.

9. Apparatus as claimed in claim 8, wherein said first means comprises a laser producing said beam of light.

10. Apparatus as claimed in claim 9, wherein said third means includes scanning means for scanning an image of said intelligence and generating electrical signals for controlling said laser.

11. Apparatus as claimed in claim 10 comprising signal storage means between said laser and scanning means.

References Cited

UNITED STATES PATENTS

| | | | |
|---|---|---|---|
| 3,196,029 | 7/1965 | Lind | 250—65 X |
| 3,256,524 | 6/1966 | Stauffer | 346—76 |
| 3,281,773 | 10/1966 | Newman | 346—33 X |
| 3,287,736 | 11/1966 | Germer | 346—108 X |

RICHARD B. WILKINSON, *Primary Examiner.*

JOSEPH W. HARTARY, *Assistant Examiner.*